United States Patent
Bek et al.

(10) Patent No.: US 9,975,191 B2
(45) Date of Patent: May 22, 2018

(54) OSCILLATORY DRIVE

(71) Applicant: C. & E. Fein GmbH, Schwaebisch Gmuend-Bargau (DE)

(72) Inventors: Fabian Bek, Boebingen (DE); Juergen Blickle, Goeppingen (DE)

(73) Assignee: C. & E. Fein GmbH, Schwaebisch Gmuend-Bargau (DE)

(*) Notice: Subject to any disclaimer, the term of this patent is extended or adjusted under 35 U.S.C. 154(b) by 662 days.

(21) Appl. No.: 14/548,053

(22) Filed: Nov. 19, 2014

(65) Prior Publication Data

US 2015/0143706 A1    May 28, 2015

(30) Foreign Application Priority Data

Nov. 25, 2013  (DE) .......... 10 2013 113 008

(51) Int. Cl.
*F16H 21/00* (2006.01)
*B23D 51/16* (2006.01)
*B27B 19/00* (2006.01)

(52) U.S. Cl.
CPC ............ *B23D 51/16* (2013.01); *B27B 19/006* (2013.01)

(58) Field of Classification Search
CPC .... B23D 49/165; B23D 51/16; B23D 49/167; B27B 19/006
See application file for complete search history.

(56) References Cited

U.S. PATENT DOCUMENTS

| | | | |
|---|---|---|---|
| 5,205,043 A | 4/1993 | Batt et al. | |
| 5,237,884 A * | 8/1993 | Seto | B27B 19/006 30/166.3 |
| 5,382,249 A | 1/1995 | Fletcher | |
| 5,456,011 A * | 10/1995 | Inkster | B23D 61/006 30/293 |
| 5,768,933 A * | 6/1998 | Tanner | B27B 19/006 30/218 |
| 6,503,253 B1 | 1/2003 | Fletcher et al. | |
| 9,579,105 B2 * | 2/2017 | Kelly | A61B 17/142 |
| 2008/0027449 A1 | 1/2008 | Gundlapalli et al. | |
| 2011/0048753 A1 | 3/2011 | Zaiser | |
| 2013/0133501 A1 | 5/2013 | Zhang | |
| 2014/0068952 A1 | 3/2014 | Soreo et al. | |
| 2014/0123785 A1* | 5/2014 | Sumi | B27B 19/006 74/45 |

FOREIGN PATENT DOCUMENTS

| | | |
|---|---|---|
| CH | 685154 A5 | 4/1995 |
| CN | 101909815 A | 12/2010 |

(Continued)

*Primary Examiner* — Jake Cook

(74) *Attorney, Agent, or Firm* — Muncy, Geissler, Olds & Lowe, P.C.

(57) ABSTRACT

An oscillatory drive is specified, having a housing in which there are accommodated a drive motor for driving a motor shaft in rotation and a tool spindle, and a first coupling drive mechanism which is coupled to the motor shaft and to the tool spindle for the purpose of driving the tool spindle in oscillatory fashion about its longitudinal axis, wherein a second coupling drive mechanism is coupled to the tool spindle such that the tool spindle performs a superposed movement composed of a rotary oscillating movement and a movement directed perpendicular to its longitudinal axis.

20 Claims, 4 Drawing Sheets

(56) References Cited

FOREIGN PATENT DOCUMENTS

| | | |
|---|---|---|
| CN | 103079761 A | 5/2013 |
| CN | 103717362 A | 4/2014 |
| DE | 69200354 T2 | 12/1994 |
| DE | 102006022804 A1 | 11/2007 |
| DE | 202012103299 U1 | 11/2012 |
| EP | 0829237 A2 | 3/1998 |
| EP | 2594364 A1 | 5/2013 |
| WO | 2012025329 A1 | 3/2012 |
| WO | 2012151122 A1 | 11/2012 |
| WO | 2012170459 A2 | 12/2012 |

* cited by examiner

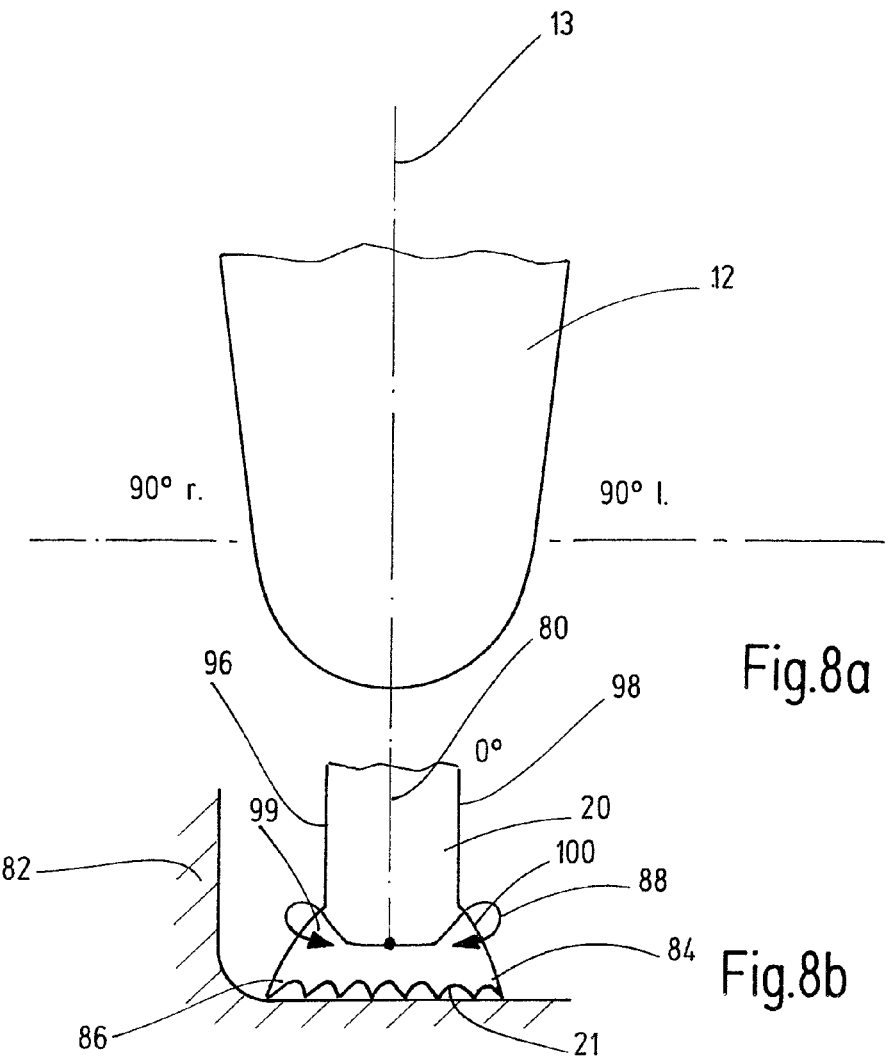
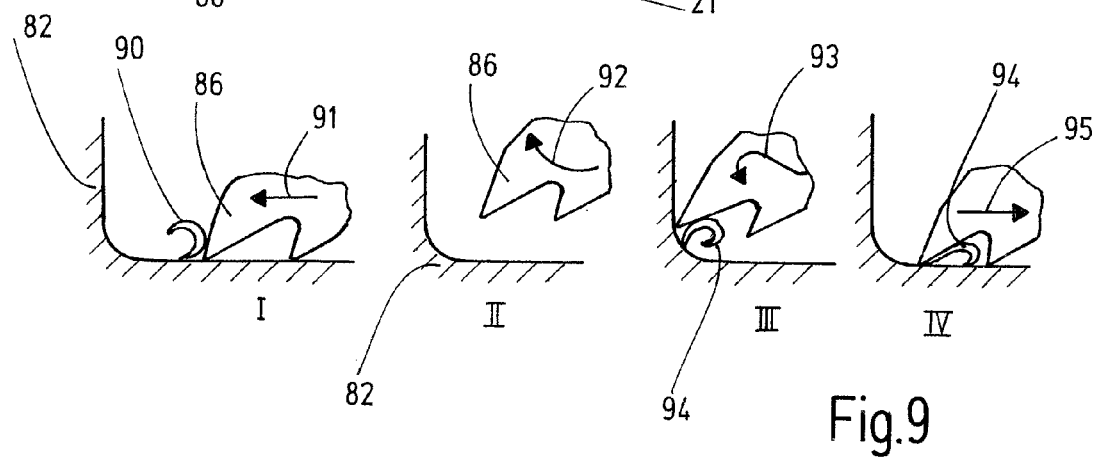
Fig.9

US 9,975,191 B2

OSCILLATORY DRIVE

CROSS REFERENCES TO RELATED APPLICATIONS

This application claims priority from German patent application 1002013 113 008.9, filed on Nov. 25, 2014. The entire content of this priority application is incorporated herein by reference.

BACKGROUND OF THE INVENTION

The invention relates to an oscillatory drive having a housing in which there are accommodated a drive motor for driving a motor shaft in rotation and a tool spindle, and a first coupling drive mechanism which is coupled to the motor shaft and to the tool spindle for the purpose of driving the tool spindle in oscillatory fashion about its longitudinal axis, and a second coupling drive mechanism which is coupled to the tool spindle.

An oscillatory drive of said type is known from EP 2 594 364 A1.

Oscillatory drives of known construction can be used for driving hand-held power tools for performing a wide variety of tasks, including in particular sawing tasks, cutting tasks and grinding tasks. Oscillatory drives are normally designed to drive a tool with a high oscillation frequency, for example in the range between 5000 oscillations per minute and 30 000 oscillations per minute (measured from reversal point to reversal point), with a small pivot angle, for example in the range between 0.5° and 7°. Highly precise machining of workpieces can be made possible in this way. During the machining of the workpieces, the tool that is driven in oscillatory fashion generates only low reaction forces or counteracting moments that must be absorbed by an operator controlling the oscillatory drive. Compared, for example, with sawing tools that are driven in rotation, for example circular saws, saw blades that are driven in oscillatory fashion pose a significantly lower risk of injury to the user. Furthermore, with elongate saw blades, it is possible for plunge cuts to be formed in particular into workpieces composed of wood, glass-fiber reinforced plastic (GRP), plaster or the like, which is possible only to a restricted extent with tools that are driven in rotation.

However, when forming plunge cuts, there is the problem that the chip spaces quickly become filled with sawdust. Furthermore, the saw blade which does not cut in a sideward direction but merely oscillates is laterally constrained during the plunge cut and is thus prevented from vibrating. The oscillation is thus relocated into the gear, into the receptacle and into the saw blade itself, and exerts load on the parts by elastic deformation and/or is converted into friction heat. In the extreme case, the saw blade comes fully to a standstill, and the machine moves back and forth.

In the case of EP 2 594 364 A1 as cited in the introduction, the oscillatory drive is provided with two eccentric coupling mechanisms, whereby it is the intention for the oscillatory movement of the tool spindle to take place with direction-dependent deflection. This means that, depending on the design of the two eccentric coupling mechanisms and depending on the switching state of the freewheels, either a conventional oscillation of the tool spindle takes place, in which it is pivoted forward and backward by the same angle in alternating fashion, or that a rotational progression can be obtained which increases in oscillatory fashion in one direction of rotation. Both cases, however, involve an oscillation about a pivot axis that is static with respect to the appliance.

The problems described above also exist in the case of an embodiment of that type.

SUMMARY OF THE INVENTION

In view of this, it is a first object of the invention to disclose an improved oscillatory drive having improved cutting performance.

It is a second object of the invention to disclose an improved oscillatory drive being particularly suited for sawing of workpieces.

It is a third object of the invention to disclose an improved oscillatory drive being particularly suited for performing plunge cuts when sawing workpieces.

These and other objects according to a first aspect of the invention are achieved by an oscillatory drive having a housing receiving a drive motor having a motor shaft driven rotatingly;
a tool spindle;
a first coupling drive mechanism being coupled to said motor shaft and to said tool spindle for driving said tool spindle oscillatingly about a longitudinal axis thereof; and
a second coupling drive mechanism being coupled to said tool spindle and said first coupling drive mechanism, said second coupling drive mechanism being configured for moving periodically in a plane perpendicular to said longitudinal axis so as to exert on said tool spindle a superposed movement composed of an oscillating movement and a movement directed perpendicular to said longitudinal axis.

Since, according to the invention, and by contrast to the prior art, the tool spindle does not remain static with respect to the appliance at a predetermined position of the housing but additionally performs a movement directed perpendicular to the longitudinal axis, the result is, in addition to the rotary oscillatory movement of the tool spindle, a superposed movement that can be utilized for chip discharge. Depending on the type of second superposed movement that is generated by means of the second coupling drive mechanism, and depending on the geometric design of the second coupling drive mechanism in relation to the geometric design of the first coupling drive mechanism, it is possible for superposed movements of the tool to be generated which can be varied within wide limits and adapted to the respective machining task. It is thus possible to realize an adaptation for example to specific sawing tasks, cutting tasks and grinding tasks.

It is preferable here if the tool spindle can be displaced in periodic fashion in a plane perpendicular to its longitudinal axis.

It is possible in this way to realize particularly advantageous resultant movements of the tool.

In a further embodiment of the invention, the second coupling drive mechanism is designed to displace the tool spindle, in the plane perpendicular to its longitudinal axis, eccentrically about a central axis that is static with respect to the housing.

By means of such a movement of the tool spindle eccentrically about a central axis, it is possible to generate certain resultant movements of the tool spindle, or of a tool clamped thereon, which are particularly advantageous for performing certain tasks. Consideration is given here in particular to the generation of a plunge cut.

To displace the tool spindle, in the plane perpendicular to its longitudinal axis, eccentrically about a central axis, it is for example possible for the tool spindle to be mounted in a hollow shaft that can be driven in rotation by means of an eccentric.

Here, the tool spindle may preferably be mounted rotatably in a hollow shaft which is in the form of an eccentric ring, within which eccentric ring the tool spindle is rotatably mounted and the outer surface, which runs eccentrically with respect to the tool spindle, of which eccentric ring is mounted rotatably in bearings on the housing.

For drive purposes, use may be made for example of a belt drive mechanism, preferably a toothed belt drive mechanism, which in turn is driven by the motor shaft.

Even though a separate drive for the eccentric ring is basically also conceivable, this results in a movement that is derived in a simple manner from the rotary drive of the motor shaft.

In a further variant of the invention, the second coupling drive mechanism is designed to pivot the tool spindle in oscillatory fashion with respect to a pivot axis that is parallel to the tool spindle.

In this way, the first oscillatory movement of the tool spindle, which is generated by the first coupling drive mechanism, has a second oscillatory movement superposed on it, such that a highly complex movement profile can be generated. Depending on the spacing between the pivot axis and longitudinal axis of the tool spindle, and depending on the direction of the first oscillatory movement and of the second oscillatory movement, and depending on the geometry that is used, it is possible here to generate specific movements of the tool that are particularly advantageous for particular working tasks.

For this purpose, the tool spindle may for example be mounted on a pivot lever which is pivotable in oscillatory fashion about a pivot axis that is static with respect to the housing.

For the drive of the pivot lever, a cam drive mechanism may be provided which, at its end remote from the tool spindle, is driven in oscillatory fashion by the motor shaft.

In this way, the drive movement for generating the oscillating pivoting movement of the tool spindle about the pivot axis of the pivot lever can be derived in a simple manner directly from the drive movement of the motor shaft.

It is preferable here for the pivot lever to be moved by means of a cam that is driven by the motor shaft, wherein a return spring is provided for the return movement of the pivot lever in the opposite direction.

Here, the return spring should be dimensioned to exhibit sufficient strength to prevent a lift-off from the cam in all phases of the pivoting movement.

In an alternative embodiment of the invention, the pivot lever may basically also be driven by way of an eccentric coupling drive mechanism that is driven by the motor shaft.

In a further variant of the invention, the second coupling drive mechanism is designed to move the tool spindle back and forth in translational fashion in one direction in a plane perpendicular to its longitudinal axis.

Even by means of such a displacement of the tool spindle back and forth in only one direction, it is possible, in combination with the oscillatory movement of the tool spindle generated by the first coupling drive mechanism, to produce a good working result. Here, too, the geometric parameters can be specifically adapted to the desired working task.

In a further embodiment of the invention, a switching device is provided for the selective activation of the second coupling drive mechanism.

In this way, it is possible for the oscillatory drive to be used either in the conventional manner using only the first coupling drive mechanism, or to utilize a superposed oscillatory movement that results from the combination of the two movements of the first coupling drive mechanism and of the second coupling drive mechanism.

Instead of the movement of the second coupling drive mechanism being generated in purely mechanical fashion for example by means of a cam drive mechanism, an eccentric drive mechanism or the like, at least one actuator may also be provided for the drive of the second coupling drive mechanism.

For this purpose, the actuator may for example be driven by means of a piezo element, a nanotube element or a fluid element.

Through the use of an actuator for the drive of the second coupling drive mechanism, said second coupling drive mechanism can be configured in a manner practically free from the normal restrictions on a mechanical coupling drive mechanism, and can be switched and controlled in a simple manner. In this way, it is possible to satisfy particular demands with regard to the resultant movement of the tool spindle. At the same time, particularly high flexibility is attained with regard to the dimensioning and configuration of the second coupling drive mechanism.

It is preferable for at least one actuator to be provided in order to permit a translational displacement of the tool spindle in a first plane that is perpendicular to its longitudinal axis. If, in addition to this, at least one further actuator is provided which permits a translational movement that differs from the first translational movement, and which is preferably perpendicular to the first translational movement, it is possible to realize any desired, even very complex displacement movements of the tool spindle with respect to a central axis that is static with respect to the housing.

Each of the actuators used may basically be embodied in any desired manner. What is preferred is an embodiment of an actuator which is driven by means of a piezo element, nanotube element or a fluid element. While a piezo element permits a very simple and inexpensive conversion of a voltage signal into a movement of the actuator, it is possible with nanotube elements to satisfy very specific demands with regard to deflection and force transmission, frequency response etc.

In the case of the actuator being embodied as a fluid element, it is possible to satisfy further demands and possibly ensure a specific damping characteristic.

The geometric coordination between the first coupling drive mechanism and the second coupling drive mechanism can be varied within wide limits.

It is accordingly possible for the first coupling drive mechanism to be driven at a first frequency and for the second coupling drive mechanism to be driven at a second frequency, wherein the ratio between the first frequency and the second frequency lies in a range from 0.01 to 100, preferably in a range from 0.1 to 10, more preferably in a range from 0.5 to 5, particularly preferably in a range from 0.5 to 1.5.

Furthermore, it is also possible for the ratio between an amplitude of the oscillatory movement of the first coupling drive mechanism and an amplitude of an oscillatory movement of the second coupling drive mechanism to be varied within wide limits, and said ratio preferably lies in a range from 0.1 to 10. Here, the amplitude is measured in each case at the tool cutting edge.

In a further embodiment of the invention, at least the ratio between the first frequency and the second frequency, or the ratio between an amplitude of the oscillatory movement of the first coupling drive mechanism and an amplitude of the oscillatory movement of the second coupling drive mechanism, or a phase angle between the two movements is adjustable.

In this way, the resultant movement of the tool spindle can be adapted to specific demands during operation. For this purpose, it may be provided that certain presets can be stored and called up for example at the push of a button. Such an embodiment can be realized in particularly flexible fashion if the movements of the second coupling drive mechanism can be generated by means of actuators.

Alternatively, the combined movement of rotary oscillation and movement oriented perpendicular to the axis of rotation may also be generated through the use of a suitable slotted guide.

To be able to generate plunge cuts in workpieces using the oscillatory drive as above, use is advantageously made of a certain saw blade which has a toothing which extends along a straight line, wherein, at each end, there is provided a corner tooth which is sharpened in both cutting directions.

In this way, it is possible to realize particularly good cutting behaviour when performing plunge cuts if the superposed movement of the tool spindle that drives the saw blade is designed such that a form of planing movement can be obtained by means of the corner teeth. A considerable improvement in cutting performance can be obtained in this way.

It is self-evident that the exemplary embodiments of the invention mentioned above and those yet to be explained below can be used not only in the respectively specified combination but also in other combinations or individually without departing from the scope of the invention.

BRIEF DESCRIPTION OF THE DRAWINGS

Further features and advantages of the invention will emerge from the following description of preferred exemplary embodiments with reference to the drawing, in which:

FIG. 8 is a diagrammatic illustration showing a plunge-cut saw blade, which is fastened to an oscillatory drive as per FIG. 1 in an angular position of 0° with respect to the machine longitudinal axis, during use in a plunge-cut sawing step, wherein FIG. 8a) shows a plan view of the gear head of the power tool from above and FIG. 8b) shows a detail view of the saw blade in a plunge cut in a workpiece; and FIG. 9 show different phases of the cutting movement of the plunge-cut saw blade as per FIG. 8b), in phases I, II, III and IV (half cycle).

DESCRIPTION OF PREFERRED EMBODIMENTS

Figure 1:
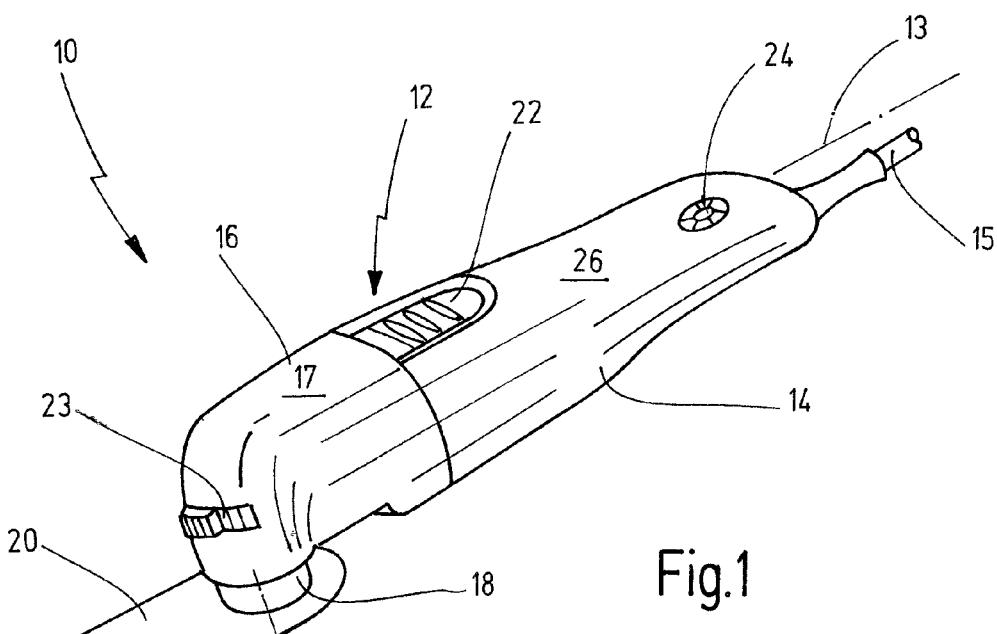
FIG. 1 is a perspective illustration of a first embodiment of a power tool according to the invention having an oscillatory drive and having a saw tool mounted thereon.

FIG. 1 shows a power tool according to the invention which is denoted as a whole by the reference sign 10. The power tool 10 is in the form of a hand-held power tool and has an oscillatory drive 12 to which a tool 20 is fastened. The oscillatory drive 12 has an elongate housing 14, on the rear end of which there is provided a mains connection cable 15. Accommodated in the rear region of the housing 14 is a motor, which is merely indicated by the reference numeral 26, wherein said motor is preferably a universal motor. Provided in the front region of the housing 14 is a gear head 16 in which an oscillation gear 17 is accommodated. A tool spindle 18 projects out of the gear head 16. Here, a longitudinal axis 19 of the tool spindle 18 runs perpendicular to a longitudinal axis 13 of the housing 14. The tool 20 is fastened to the outer end of the tool spindle 18, wherein, in the situation illustrated, said tool is an elongate saw blade with a straight toothing 21 which is suitable for generating plunge cuts.

On the front end of the gear head 16, it is also possible to see a switch 23 by means of which the oscillation gear 17 can be switched in a manner yet to be described further below. At that end of the housing 14 which faces toward the mains connection cable 15, there is also shown a control knob 24 by means of which certain parameters of the oscillation gear 17 can be set.

It is self-evident that the on/off switch 23 and the control knob 24 are purely of an optional nature. Likewise, it is self-evident that the power tool 10 may also be in the form of a battery-powered appliance.

A first embodiment of an oscillatory drive 12 according to the invention will be explained in more detail below on the basis of FIG. 2. The oscillation gear 17 is in this case composed of a first coupling drive mechanism 30 and a second coupling drive mechanism 38, by means of which a resultant drive movement of the tool spindle 18 is generated.

The first coupling drive mechanism 30 is in the form of an eccentric coupling drive mechanism of basically known construction. A motor shaft 28 of the motor 26 is mounted rotatably on the housing 14 by means of a bearing 31. An eccentric 32 that is driven by the motor shaft 28 drives the tool spindle 16 by way of an eccentric fork 34 which is connected rotationally conjointly to the tool spindle 18 and which is moved in oscillatory fashion by the eccentric 32 by way of an eccentric bearing 35. The eccentric bearing 35 is of spherical form and engages on the eccentric 32 by way of a needle roller bearing 36. The eccentric fork 34 surrounds the eccentric bearing 35 on both sides and generates an oscillating drive movement of the tool spindle 18 with a small pivot angle (for example 0.5° to 7°, measured in each case from reversal point to reversal point) and a high frequency (for example 5000 oscillations per minute to 30 000 oscillations per minute). Such eccentric coupling drive mechanisms are basically known in the prior art and are used for driving the tool spindle of an oscillatory drive about its longitudinal axis with a rotary oscillation movement.

According to the present invention, there is provided in addition to the first coupling drive mechanism 30 a second coupling drive mechanism 38 which additionally displaces the tool spindle 18 in periodic fashion in a plane perpendicular to the longitudinal axis 19 of the tool spindle 18. In the situation described here on the basis of FIG. 2, the tool spindle is moved in circulating fashion about a central axis 46 which is static with respect to the housing and which has an eccentricity e.

For this purpose, the tool spindle 18 is mounted rotatably in a hollow shaft 40 which has an eccentric ring 41. The tool spindle 18 can be moved in rotationally oscillating fashion within the inner surface of the eccentric ring 41 by means of two inner bearings 42. The outer circumference of the eccentric ring 41 is arranged offset with respect to the longitudinal axis 19 of the tool spindle 18. A central axis 46 of the eccentric ring 41 is thus offset with respect to the longitudinal axis 19 of the tool spindle 18 by the eccentricity e. The eccentric ring 41 is rotatably mounted on the housing 14 by means of outer bearings 44. The eccentric ring 41 is driven in rotation by the motor shaft 28 by way of a belt drive mechanism. For this purpose, a belt 50, for example in the form of a toothed belt, runs over a belt pulley 48 on the motor shaft 28 and is deflected, twofold, by means of rollers 49. The belt 50 is guided directly over the outer surface of the eccentric ring 41 and thus drives the eccentric ring 41 in rotation about its central axis 46.

In this way, the tool spindle 18 is moved in circulating fashion about the central axis 46 by way of a uniform eccentricity e. The eccentric bearing 35 is designed such that the related axial displacement of the eccentric bearing 35 on the eccentric 32 is readily possible.

Figure 3:
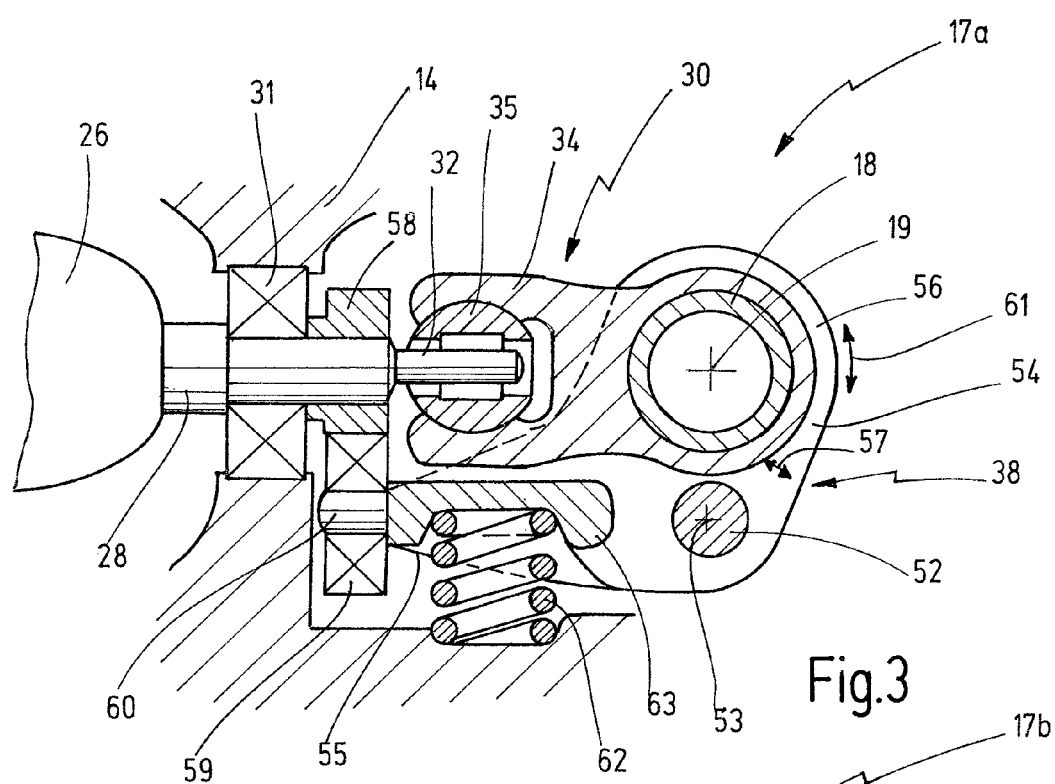
FIG. 3 shows a section through the oscillation gear in an embodiment that is modified in relation to the embodiment as per FIG. 2.

FIG. 3 shows a modified embodiment of the oscillation gear which is denoted as a whole by the reference sign 17a. In this figure and also in the subsequent figures, corresponding reference signs are used for corresponding parts.

The second coupling drive mechanism 38 is designed such that the tool spindle 18, which is driven in oscillatory fashion by the first coupling drive mechanism 30, is additionally pivoted in oscillatory fashion about a pivot axis 53 by means of a pivot lever 54. If the tool spindle 18 as per FIG. 1 has fastened thereto a tool 20 in the form of the elongate saw blade illustrated in said figure, the resultant movement of the tool 20 and in particular of the toothing 21 is self-evidently dependent on the orientation in which the tool 20 is clamped with respect to the longitudinal axis 13 of the oscillatory drive 12.

In the present case as per FIG. 3, the construction of the first coupling drive mechanism 30 corresponds to the construction described above as per FIG. 2. By contrast, the second coupling drive mechanism 38 is designed such that an oscillatory movement can be generated by means of said second coupling drive mechanism also.

The second coupling drive mechanism 38 has the pivot lever 54 which, on a pivot shaft 52, can be driven pivotably in oscillatory fashion about the pivot axis 53, as indicated by an arrow 57. The pivot lever 54 has a first end 55 which is pivoted in oscillatory fashion by means of a cam drive mechanism. The tool spindle 18 is received on the second end 56 of the pivot lever 54 by means of a bearing (not illustrated).

The motor shaft 28 of the motor 26 is mounted on the housing 14 by means of a bearing 31. On the motor shaft 28 there is seated a cam ring 58 which, by way of a bearing 59 that rolls thereon, moves a journal 60 which is formed on the first end 55 of the pivot lever 54. The bearing 59 is, by way of the journal 60, pressed against the cam 58 by means of a spring 62. The spring 62 is enclosed between the housing 14 and a spring receptacle 63 on the pivot lever 54. The spring 62 is a high-strength helical spring which ensures an adequate contact pressure between the bearing 59 and the cam 58 in all situations, such that a lift-off from the cam 58 is prevented regardless of the respective external load.

In the embodiment as per FIG. 3, the oscillatory drive movement of the first coupling drive mechanism 30, as indicated by the arrow 61, additionally has an oscillatory movement of the tool spindle 18 superposed on it by means of the pivot lever 54, as indicated by the arrow 57. If a tool 20 is fastened to the tool spindle 18 so as to extend, as per the illustration in FIG. 1, approximately in the direction of the longitudinal axis 13 of the oscillatory drive 12, there is a resulting movement at the toothing 21 which leads to an oscillating lifting movement from the cutting location on a workpiece, as will be described in more detail below on the basis of FIGS. 8 and 9.

By contrast, if the tool 20 is clamped on the tool spindle 18 in a different orientation, the result is a considerably reduced effect of the second oscillatory movement generated by the second coupling drive mechanism 38, since the direction of the first oscillatory movement of the first coupling drive mechanism 30 and of the second oscillatory movement of the second coupling drive mechanism 38 lie much closer together than in the case of the other clamping configuration of the tool 20.

It is self-evident that the eccentric bearing 35 must be capable of transmitting the oscillatory movement, which is transmitted from the pivot lever 54 to the tool spindle 18, in the axial direction to the eccentric 32.

If appropriate, it would also be possible for a cam ring with multiple cams to be provided on the motor shaft 28 in order to ensure an effectively combined oscillatory movement even when the tool 20 is clamped in a different configuration.

Figure 4:
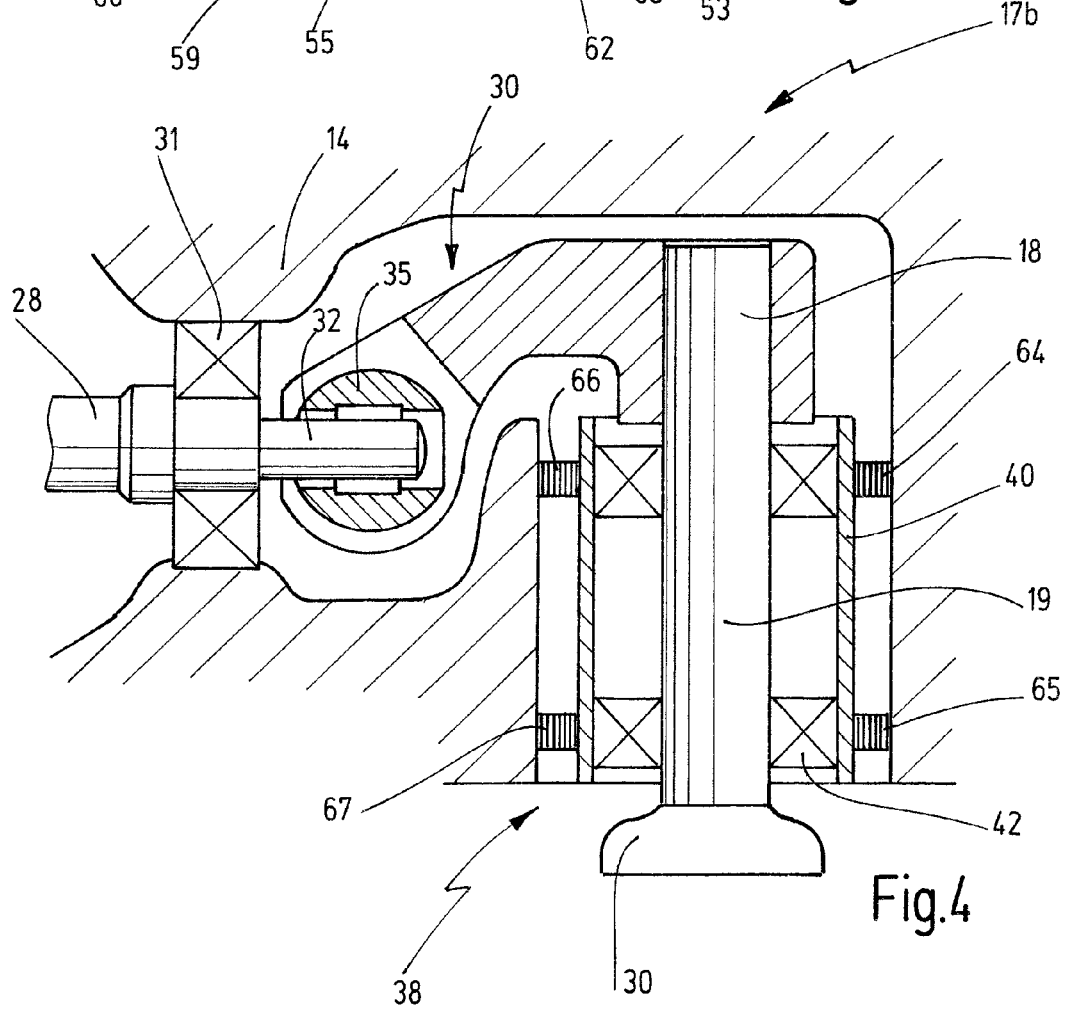
FIG. 4 shows a section through a further modification of an oscillation gear modified in relation to the embodiment as per FIG. 2.

A further embodiment of an oscillation gear according to the invention is illustrated in FIG. 4 and is denoted as a whole by the reference sign 17b.

Figure 2:
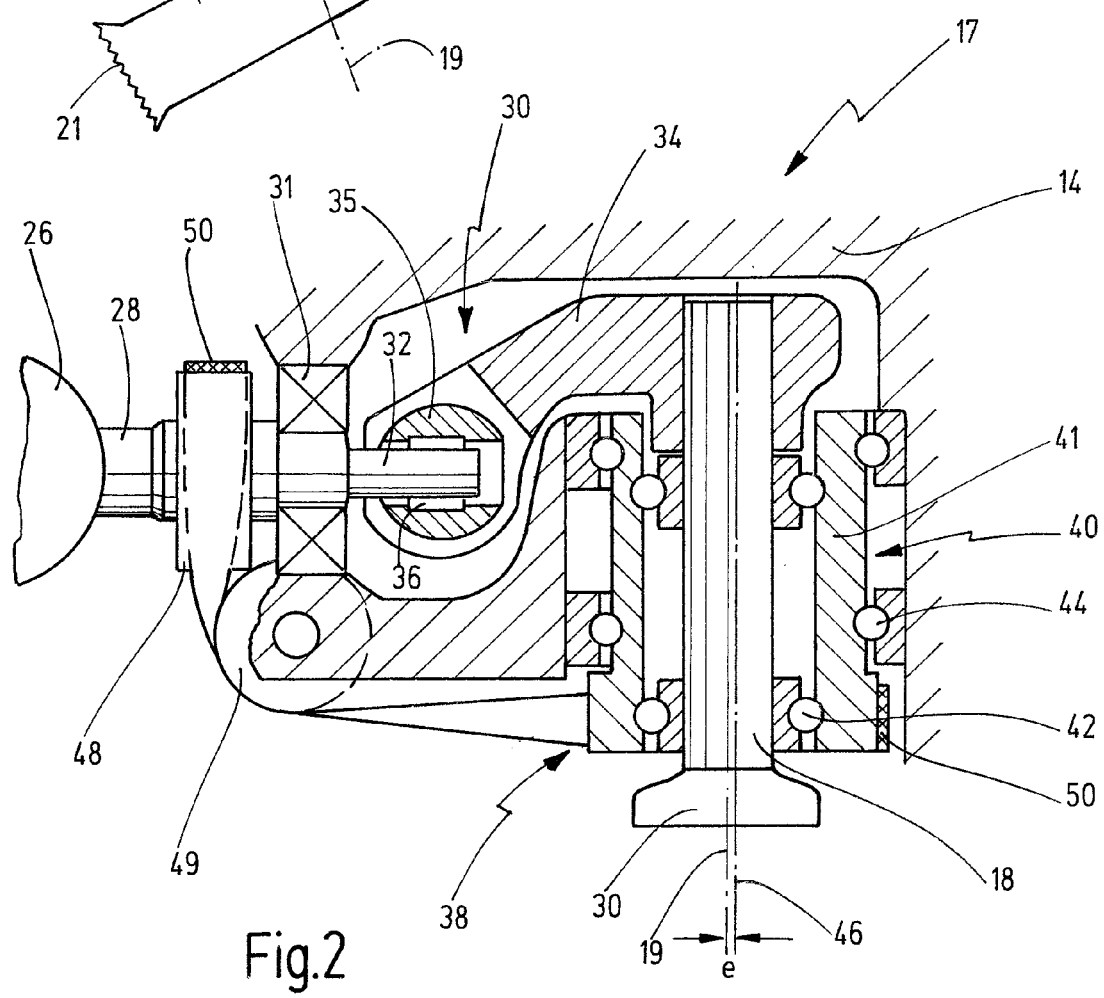
FIG. 2 shows a simplified section through the oscillation gear as per FIG. 1 in an enlarged illustration.

Here, the construction of the first coupling drive mechanism 30 corresponds to the construction of the first coupling drive mechanism 30 as per FIG. 2. By contrast, the second coupling drive mechanism 38 is not driven by the motor shaft 28 via a belt drive mechanism but can be moved in a direction perpendicular to the longitudinal axis 19 of the tool spindle 18 by means of actuators 64, 65, 66, 67 that act on the hollow shaft 40.

The tool spindle 18 is in turn rotatably mounted within the hollow shaft 40 by means of bearings 42. The outer surface of the hollow shaft 40 is engaged on, on each side, by two actuators 64, 65 and 66, 67, said actuators being supported on the housing 14. Here, the actuators may for example be actuators driven by piezo elements.

If, for example, the actuators 65 and 65 have a voltage applied to them which presently results in a displacement of the tool spindle 18 to the left, and if the actuators 66 and 67 on the opposite side have applied to them a correspondingly directed voltage which results in a corresponding contraction, the hollow shaft 40 is at that moment displaced to the left.

A corresponding change in the voltage signals results, in turn, in a movement in the hollow shaft 40 in the opposite direction. Accordingly, by the application of oscillating voltage signals to the actuators 64 to 67, the tool spindle 18 can be moved back and forth in translational oscillatory fashion.

If further actuators are provided along the hollow spindle 40, preferably perpendicular to the drawing plane in a plane perpendicular to the plane through which the actuators 64 to 67 extend, it is thus possible, in addition to the oscillatory movement generated by the first coupling drive mechanism 30, to impart any desired movement to the tool spindle 18, the phase position, form and amplitude of which movement can be influenced within wide limits by means of the actuators 64 to 67 and the additional actuators in the further plane.

It is in turn self-evident that the eccentric bearing 35 must be capable of following the axial movement generated by the displacement of the tool spindle 18, without wear to the eccentric 32.

Figure 5:
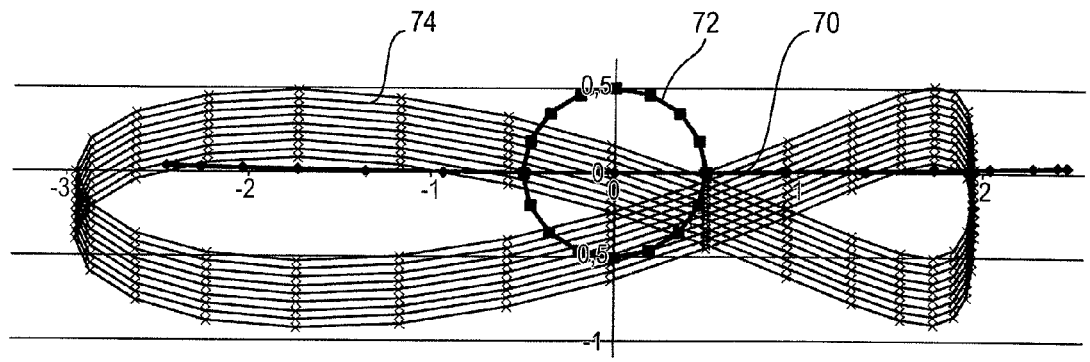
FIG. 5 is an illustration of the resultant movement of a sawtooth tip of a saw blade mounted on the tool spindle, when using a first set of geometric parameters and an embodiment of the oscillation gear as per FIG. 2.

Different geometric configurations of the oscillation gear 17 as per FIG. 2 will now be explained in more detail on the basis of FIGS. 5 to 7.

Here, the tool spindle 18 is moved in rotation about the central axis 46, which is static with respect to the appliance, by means of the second coupling drive mechanism 38. Said movement is illustrated by way of the circular line 72 with different coordinate points. The oscillatory movement of the tool spindle 18 generated by the first coupling drive mechanism 30 is illustrated by the line 70. In the present case, the rotation of the hollow shaft 40 takes place at a rotational speed (f2)(rpm) which is twice the frequency of the oscillatory movement (f1¬)(rpm) of the tool spindle 18. The ratio u=f1/f2 is accordingly 0.5. In FIG. 5, the movement of the tip of a central tooth is illustrated by the lines 74 with the corresponding coordinate points. 74 thus shows the movement resulting from the oscillatory movement as per reference sign 70, the rotary movement as per reference sign 72, and the feed movement applied by the user.

Here, the tool 20 is clamped on the oscillatory drive 12 such that the longitudinal axis of the tool 20 as per FIG. 1 runs in the direction of the longitudinal axis 13 of the oscillatory drive 12. The oscillatory drive 12 is situated above, and the cutting feed movement takes place downward in FIG. 5. In the situation illustrated, the result is a movement of the sawtooth in the form of a horizontal figure of eight.

Depending on the angle at which the tool 20 is clamped on the oscillatory drive 12, the movement form changes, but the principle is maintained.

Figure 6:
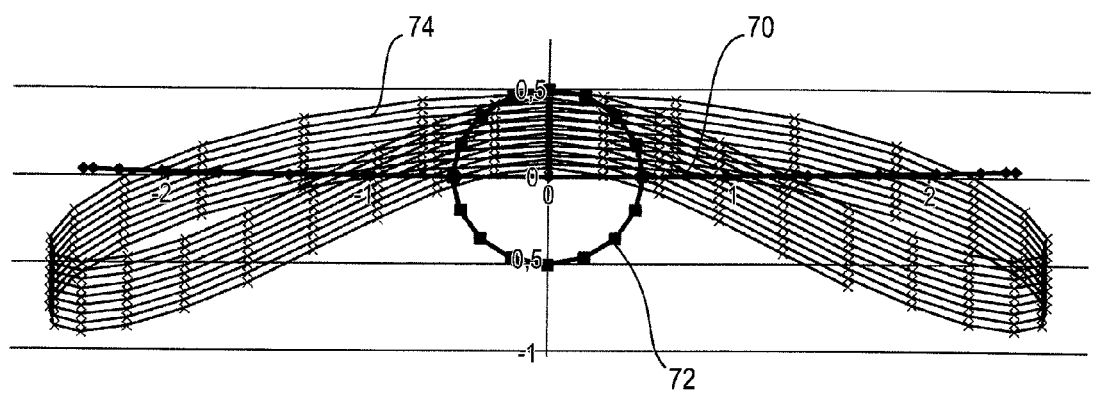
FIG. 6 is an illustration of the resultant movement of a sawtooth tip of a saw blade mounted on the tool spindle, when using parameters slightly modified in relation to the embodiment as per FIG. 5.

FIG. 6 shows the resultant movement 74 in the case of the saw blade being clamped having been rotated through 90°, with otherwise unchanged parameters. The longitudinal axis of the tool 20 is thus perpendicular to the longitudinal axis 13 of the oscillatory drive 12 as per FIG. 1. This means that the toothing 21 runs approximately in the longitudinal direction of the longitudinal axis 13 of the oscillatory drive 12. In the illustration as per FIG. 6, the oscillatory drive 12 is situated at the top, and the feed movement is again oriented in the downward direction.

Figure 7:
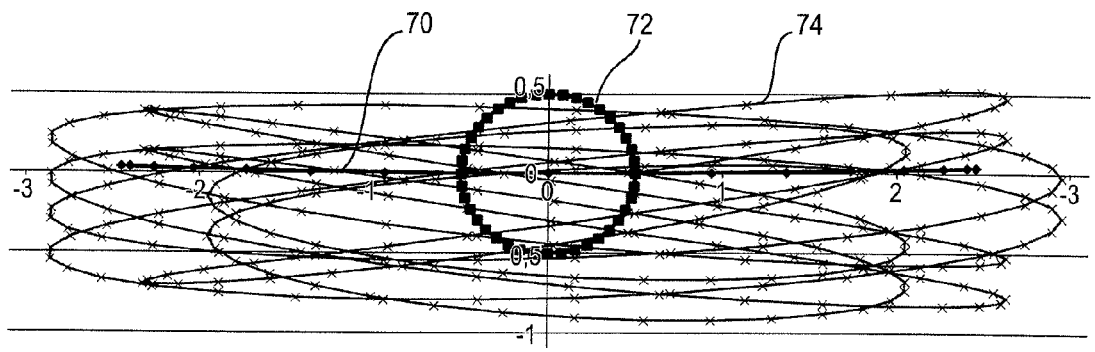
FIG. 7 is an illustration of the resultant movement of a sawtooth tip of a saw blade mounted on the tool spindle, when using parameters further modified in relation to the embodiment as per FIG. 5.

FIG. 7 shows a transmission ratio u=f1/f2 with 0.8 rotations and an oscillation. In this case, u=f1/f2=1/0.8=1.25. Here, the tooth makes numerous idle passes in the air before plunging into the material again. This may however by all means be advantageous when considering a plunge cut, because the chip discharge action is improved in this way.

The transmission ratio u and also the associated amplitude can be varied within wide limits. It can basically be stated that the slower the eccentric movement of the hollow shaft 40 (imparted rotary movement) is in relation to the oscillatory movement of the tool spindle 18, the less pronounced is the movement of the tool 20 in a direction perpendicular to the cutting edge 21, such that a clean cutting action during a plunge cutting process is less pronounced. If the reciprocal of u, that is to say the ratio 1/u, differs from an integer value, the more likely it is that a tooth will run through the air and only occasionally impart a cutting action.

The effect on the cutting behaviour of a tool 20 when using an oscillatory drive 17a as per FIG. 3 in a plunge cutting process will be explained in more detail on the basis of FIGS. 8 and 9.

FIG. 8 shows the cutting behaviour of a tool 20 in the form of a plunge-cut saw blade as per FIG. 1. Here, the saw blade 20 is clamped with its longitudinal axis 80 in the direction of the longitudinal axis 13 of the oscillatory drive 12. Said saw blade has two mutually parallel side edges 96, 98 and a toothing 21 which extends perpendicular to the longitudinal axis 80 and which runs rectilinearly. At the two ends, the side edges 96, 98 of the tool 20 transition into the straight cutting edge 21 via angled sections 99, 100 which widen outward from the mutually parallel straight side edges 96, 98.

If the tool 20 is clamped in an orientation perpendicular to the clamping configuration as per FIG. 8 (rotated 90° to the right or 90° to the left), entirely different conditions are obtained.

FIG. 8a) shows the clamping orientation of the tool 20; FIG. 8b) additionally shows the engagement of the tool 20 in a plunge cut in a workpiece 82.

The workpiece 20 may for example consist of hardwood. 88 denotes the movement curve of a central sawtooth that results when use is made of the oscillation gear 17a as per FIG. 3 and a 0° clamping orientation.

The toothing 21 is now advantageously designed such that the two outer corner teeth 84 and 86 of the toothing 21 cut in both spatial directions, that is to say both in the case of a movement to the left and to the right in the illustration as per FIG. 8b) and also during a movement in the feed direction.

FIG. 9 shows the different phases of half of a cutting cycle in the case of a clamping configuration at an angle of 0° as per FIG. 8a) or b). When the saw blade moves to the left as indicated by the arrow 91, a chip 90 is formed, as per FIG. 9I. The corner tooth 86 thus acts as a plane.

FIG. 9II shows the lift-off of the corner tooth 86 in a subsequent phase as per the arrow 92. FIG. 9III shows the movement downward in the direction of the arrow 93, with a chip 94 again being planed off. Said chip proceeds in the movement to the right corresponding to the arrow 95 as per FIG. 9IV.

The toothing 21 may, as illustrated here, be designed for cutting in a preferential direction, though may if appropriate also be designed as a symmetrical toothing without a preferential direction.

In any case, both corner teeth 84, 86 are ground on both sides so as to permit cutting in both directions.

What is claimed is:
1. An oscillatory drive having a housing receiving
    a drive motor having a motor shaft driven rotatingly;
    a tool spindle being configured for receiving a tool;
    a first coupling drive mechanism being coupled to said motor shaft and to said tool spindle for driving said tool spindle oscillatingly about a longitudinal axis thereof in an oscillatory motion having a first amplitude;
    a second coupling drive mechanism being coupled to said tool spindle and said first coupling drive mechanism, said second coupling drive mechanism being configured for exerting a second periodical motion perpendicular to said longitudinal axis and having a second amplitude, whereby said tool spindle exerts a superposed movement composed of an oscillating movement oscillating back and forth about said longitudinal axis and a movement directed perpendicular to said longitudinal axis; and an adjustment means for adjusting at least one parameter selected from a ratio between said first and second amplitudes and a phase angle between said oscillatory motion of said first coupling drive mechanism and said second periodical motion of said second coupling drive mechanism.

2. An oscillatory drive having a housing receiving a drive motor having a motor shaft driven rotatingly;

a tool spindle being configured for receiving a tool;

a first coupling drive mechanism being coupled to said motor shaft and to said tool spindle for driving said tool spindle oscillatingly about a longitudinal axis thereof in an oscillatory motion having a first amplitude;

a second coupling drive mechanism being coupled to said tool spindle and said first coupling drive mechanism, said second coupling drive mechanism being configured for exerting a second periodical motion perpendicular to said longitudinal axis and having a second amplitude, whereby said tool spindle exerts a superposed movement composed of an oscillating movement oscillating back and forth about said longitudinal axis and a movement directed perpendicular to said longitudinal axis; and wherein a ratio between said first and second amplitudes is in a range from 0.1 to 10; and a phase angle between said oscillatory motion of said first coupling drive mechanism and said second periodical motion of said second coupling drive mechanism.

3. The oscillatory drive of claim 2, wherein said first coupling drive mechanism is configured for being driven at a first frequency and said second coupling drive mechanism is configured for being driven at a second frequency, and wherein a ratio between said first frequency and said second frequency is in a range from 0.01 to 100.

4. The oscillatory drive of claim 2, further comprising an adjusting means for adjusting at least one of said amplitude ratio and a phase angle between said first and second coupling drive mechanisms.

5. The oscillatory drive of claim 1, wherein said first coupling drive mechanism is configured as an eccentric coupling drive mechanism, said eccentric coupling drive mechanism comprising an eccentric being driven by said motor shaft, and an eccentric bearing arranged on said eccentric, said tool spindle being coupled to a pivot lever engaging said eccentric bearing for driving said tool spindle oscillatingly about said longitudinal axis.

6. An oscillatory drive having a housing receiving a drive motor having a motor shaft driven rotatingly;

a tool spindle being configured for receiving a tool;

a first coupling drive mechanism being coupled to said motor shaft and to said tool spindle for driving said tool spindle oscillatingly about a longitudinal axis thereof;

a second coupling drive mechanism being coupled to said tool spindle and said first coupling drive mechanism, said second coupling drive mechanism being configured for moving periodically in a plane perpendicular to said longitudinal axis so as to exert on said tool spindle a superposed movement composed of an oscillating movement oscillating back and forth about said longitudinal axis and a movement directed perpendicular to said longitudinal axis.

7. The oscillatory drive of claim 6, wherein said second coupling drive mechanism is coupled to said tool spindle for displacing said tool spindle periodically in a plane perpendicular to said longitudinal axis.

8. The oscillatory drive of claim 6, wherein said second coupling drive mechanism is configured for displacing said tool spindle in a plane perpendicular to said longitudinal axis eccentrically about said longitudinal axis.

9. The oscillatory drive of claim 8, further comprising a hollow shaft wherein an eccentric is mounted for driving said tool spindle along a circle eccentrically about said longitudinal axis within said hollow shaft.

10. The oscillatory drive of claim 9, further comprising bearings received within said housing, an eccentric ring being mounted rotatably within said bearings, said tool spindle being mounted within said eccentric ring rotatably by means of bearings so as to allow rotating said tool spindle along a circle eccentrically about said longitudinal axis.

11. The oscillatory drive of claim 9, further comprising a belt drive mechanism said hollow shaft engaging said motor shaft and said tool spindle for driving said hollow shaft.

12. The oscillatory drive of claim 6, wherein said second coupling drive mechanism is configured for pivoting said tool spindle oscillatingly with respect to a pivot axis extending parallel to said longitudinal axis of said tool spindle.

13. The oscillatory drive of claim 12, further comprising a pivot lever being pivotable in oscillatory fashion about said pivot axis that is static with respect to said housing, said tool spindle being mounted on said pivot lever.

14. The oscillatory drive of claim 13, further comprising a cam drive mechanism driven oscillatingly by said motor shaft, said cam drive mechanism driving said pivot lever at an end thereof being remote from said tool spindle.

15. The oscillatory drive of claim 14, wherein said cam drive mechanism further comprises a cam being driven eccentrically by said motor shaft and a return spring for biasing said pivot lever against said cam.

16. The oscillatory drive of claim 13, further comprising an eccentric coupling drive mechanism being driven by said motor shaft and driving said pivot lever.

17. The oscillatory drive of claim 6, wherein said second coupling drive mechanism is configured for moving said tool spindle back and forth in one direction in a plane perpendicular to said longitudinal axis.

18. The oscillatory drive of claim 6, further comprising a switch for selectively activating or deactivating said second coupling drive mechanism.

19. The oscillatory drive of claim 6, wherein said second coupling drive mechanism further comprises at least one actuator for driving said coupling drive mechanism.

20. The oscillatory drive of claim 19, further comprising at least a first actuator for displacing said tool spindle in a first direction, and at least a second actuator for displacing said tool spindle in a second direction that differs from said first direction.

* * * * *